(12) United States Patent
Perevodchikov et al.

(10) Patent No.: US 11,138,631 B1
(45) Date of Patent: Oct. 5, 2021

(54) PREDICTIVE USER SEGMENTATION MODELING AND BROWSING INTERACTION ANALYSIS FOR DIGITAL ADVERTISING

(71) Applicant: Amazon Technologies, Inc., Seattle, WA (US)

(72) Inventors: Evgeniy V. Perevodchikov, Seattle, WA (US); Paula Marie Despins, Seattle, WA (US); Gerard Gjonej, Bellevue, WA (US); Avishkar Misra, Sammamish, WA (US); Alman Ahmad Shibli, Hoboken, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 693 days.

(21) Appl. No.: 14/928,761

(22) Filed: Oct. 30, 2015

(51) Int. Cl.
  *G06Q 30/00* (2012.01)
  *G06Q 30/02* (2012.01)
  *G06N 5/04* (2006.01)

(52) U.S. Cl.
  CPC ........... *G06Q 30/0255* (2013.01); *G06N 5/04* (2013.01); *G06Q 30/0269* (2013.01)

(58) Field of Classification Search
  CPC ............................... G06Q 10/00; G06Q 30/00
  See application file for complete search history.

(56) References Cited

U.S. PATENT DOCUMENTS

| | | | | |
|---|---|---|---|---|
| 7,725,300 B2 * | 5/2010 | Pinto | ................... | G06Q 30/0201 703/2 |
| 10,242,019 B1 * | 3/2019 | Shan | ....................... | G06N 7/005 |
| 2008/0147505 A1 * | 6/2008 | Davis | ..................... | G06Q 30/02 705/14.64 |
| 2012/0023046 A1 * | 1/2012 | Verma | .................... | G06Q 30/02 706/12 |
| 2014/0067597 A1 * | 3/2014 | Kirkby | .................... | H04L 67/18 705/26.7 |
| 2014/0095285 A1 * | 4/2014 | Wadell | ................... | G06Q 30/00 705/14.25 |
| 2014/0108143 A1 * | 4/2014 | Davitz | ............... | G06Q 30/0255 705/14.53 |

(Continued)

OTHER PUBLICATIONS

Sebastian Raschka, Predictive Learning Supervised Machine Learning and Pattern Classification, Aug. 25, 2014, Sebastian Raschka (Year: 2014).*

(Continued)

*Primary Examiner* — Naresh Vig

(74) *Attorney, Agent, or Firm* — Eversheds Sutherland (US) LLP

(57) ABSTRACT

Systems, methods, and computer-readable media are disclosed for predictive user segmentation modeling and browsing interaction analysis for digital advertising. In one embodiment, an example method may include identifying a target consumer segment, generating a predictive user behavior model for the target consumer segment based at least in part on selected user data, and receiving an indication that a user is browsing a website. Example methods may include generating a first customer score for the user using the predictive user behavior model in real-time, and determining that the first customer score meets a consumer segment modification threshold for the target consumer segment.

13 Claims, 8 Drawing Sheets

(56) References Cited

U.S. PATENT DOCUMENTS

| | | | |
|---|---|---|---|
| 2014/0222503 A1* | 8/2014 | Vijayaraghavan | G06Q 30/0201 705/7.29 |
| 2014/0304211 A1* | 10/2014 | Horvitz | G08G 1/0104 706/52 |
| 2015/0339754 A1* | 11/2015 | Bloem | G06F 16/9535 705/26.7 |
| 2016/0071017 A1* | 3/2016 | Adjaoute | G06N 20/00 706/52 |
| 2016/0125456 A1* | 5/2016 | Wu | G06Q 30/0251 705/14.49 |

OTHER PUBLICATIONS

Definition of Determine by Merriam-Webster, Jul. 12, 2015, Merriam-Webster, printed through www.archive.org (Year: 2015).*

Wikipedia article "Search Algorithm", Jun. 20, 2015, Wikipedia.org, printed through www.archive.org (Year: 2015).*

* cited by examiner

PREDICTIVE USER SEGMENTATION MODELING AND BROWSING INTERACTION ANALYSIS FOR DIGITAL ADVERTISING

BACKGROUND

Brands may desire to acquire new customers or to reengage customers that have not recently purchased a product associated with the brand. Similarly, advertisers may desire to target users that have certain preferences or characteristics, such as hiking enthusiasts. In order to acquire these customers, brands or advertisers may develop ad campaigns or other promotions. However, targeting customers that may be potential new customers or reengaged customers may be difficult. Further, certain customers may have a relatively higher likelihood of becoming new or reengaged customers. As a result, the ad campaigns or promotions may not be effective because the ad campaigns or promotions may not reach the most likely potential customers.

Figure 1:
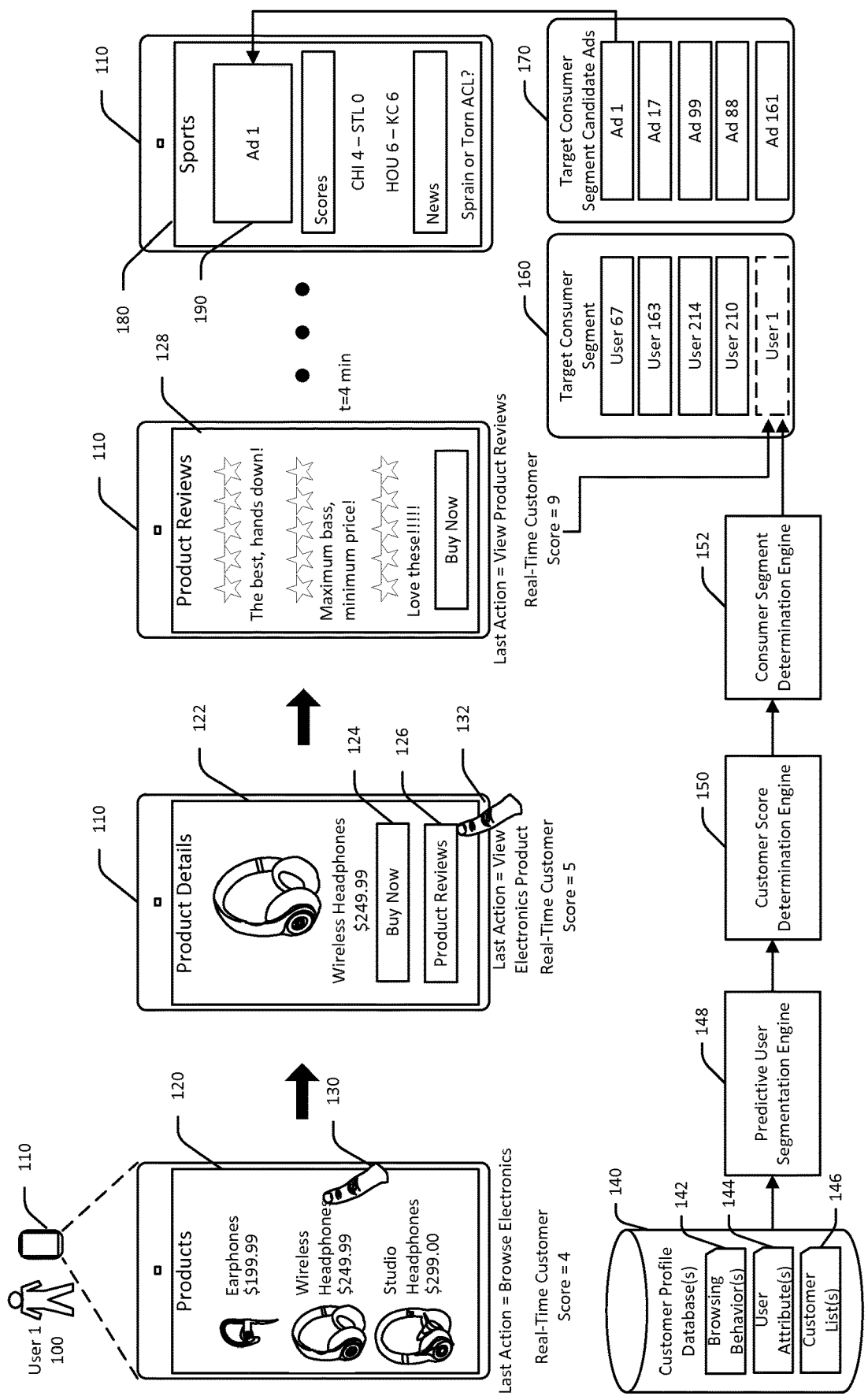
FIG. 1 is a hybrid user interface and process flow diagram illustrating predictive user segmentation modeling and browsing interaction analysis for digital advertising in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

In the context of online advertising, an advertisement may be delivered for presentation (e.g., rendering) in an advertising slot. Presentation of the advertisement in an advertising slot may be referred to as serving an advertisement impression. As used herein, the terms "advertising slot" or "available advertising slot" may refer generally to a location, environment, or placeholder in which, or in connection with which, an impression of an advertisement may be served. In a more specific context, these terms may refer to, for example, a particular location on a web page at which an impression of an advertisement may be presented to and potentially consumed by a user. A collection of available advertising slots may be referred to herein as "advertising inventory." Further, the terms "delivery of an advertisement," "delivery of an advertisement impression," "presentment of an advertisement impression," "serving an ad impression," or any other similar term may be used interchangeably throughout this disclosure.

This disclosure relates to, among other things, systems, methods, computer-readable media, techniques, and methodologies for predictive user segmentation modeling and browsing interaction analysis for digital advertising. Advertisers and brand owners may develop marketing or advertising campaigns ("ad campaigns") that are directed towards specific consumers. For example, an ad campaign may be directed toward a target consumer, which may be a consumer within a certain demographic or certain geography, a consumer that has certain attributes (e.g., recent purchases or browsing history, etc.), a consumer that has specific preferences or characteristics, or other targeting criteria. By targeting certain consumers, an effectiveness of an ad campaign may be improved. Effectiveness of an ad campaign may be determined, for example, by ad campaign goals (e.g., new customer acquisition, increase in sales, certain click rates, etc.) or by determining whether a consumer presented with an ad of the ad campaign reacts in a desired manner (e.g., clicks on the ad, buys the product, etc.). To accomplish the goals of the ad campaign, an advertiser may desire to present ads to target consumers identified by various targeting criteria, such as age or age range, demographics, geographic location, gender, or other criteria.

Once an ad campaign has established one or more goals, the ads associated with the ad campaign may be presented to consumers that meet certain targeting criteria. Embodiments of the disclosure may, among other features, determine targeting criteria for a certain ad campaign goal, and may identify consumers that meet the determined targeting criteria, resulting in increased effectiveness of ad campaigns. In some embodiments, active users, such as users that are actively browsing a website or other digital media, may be monitored in real-time to determine whether an active user should be part of a particular consumer segment. For example, a consumer segment may be an electronics consumer segment that includes users interested in purchasing electronic goods. Upon determining that an active user should be part of a particular consumer segment, the user may be presented with ads that are associated with the particular consumer segment. Consumer segments may be linked to or otherwise associated with particular advertisements, such that the consumer segments correspond to a targeted consumer of the particular advertisement. If it is determined that the user should no longer be a part of the particular consumer segment, the user may be removed from the consumer segment and may no longer be presented with ads associated with the consumer segment.

To determine whether an active user belongs in or out of a consumer segment, embodiments of the disclosure may algorithmically determine dynamic customer scores in real-time based at least in part on browsing behaviors or other digital interactions exhibited by the user. A customer score may be a numerical or other suitable value indicative of a probability of whether a user belongs in a particular consumer segment. The customer score may be determined based at least in part on other users having interaction histories or consumer profiles that are similar to or meet a threshold similarity to the user.

Determinations as to whether a user belongs in a consumer segment may be based at least in part on a likelihood or probability that the user belongs to a respective consumer segment. The probability that the user belongs to a particular consumer segment may be determined based at least in part on products or product categories the user has interacted with (e.g., clicked on, viewed, researched, searched for, purchased, etc.), other advertisements the user has reacted to, as well as other factors. For example, a user that views gaming consoles frequently and/or purchases DVDs may be associated with an electronics consumer segment, and a different user that clicks on footwear advertisements may be associated with both a clothing consumer segment and a footwear consumer segment or sub-segment. If the customer score for a user indicates that the user belongs in a consumer segment, the user may be associated with that particular consumer segment.

In embodiments of the disclosure, advertisements that are available for presentation may be associated with particular consumer segments that correspond to targeting criteria, such that advertisements are presented or served to consumers within particular consumer segments that may be more likely to react to the advertisement than consumers not in the relevant consumer segment. Accordingly, advertisements may be served to consumers, or users, that are members of a consumer segment related to the advertisement being presented, and may therefore correspond to a targeted consumer of the advertisement. By identifying consumer segments that users are likely to be a part of, ad campaigns may reach more target consumers and/or have improved effectiveness by reaching consumers more likely to take action based on the ad campaign.

Embodiments of the disclosure may algorithmically identify users that meet or exceed a certain predetermined likelihood of becoming new customers of a particular brand in real-time, and may allow advertisers to target the identified users. In one embodiment, the users to target may be identified based at least in part on an analysis of recent new customers to the brand. For example, purchasing and browse behavior of recent new customers may be analyzed to determine patterns or other metrics and similarities amongst the new customers, and the same behaviors from active users may be monitored to determine a level of similarity between an active user and previous new to brand customers. If a threshold level of similarity is met, the active user may be a potential new to brand customer, and may become eligible for advertisements associated with the brand. Certain embodiments of the disclosure may generate model based consumer segments for targeted advertising. For example, based at least in part on historical data for a particular advertiser, embodiments of the disclosure may be configured to implement advertising campaign goals of new customer acquisition.

Referring to FIG. 1, an example hybrid user interface and process flow diagram illustrating predictive user segmentation modeling and browsing interaction analysis for digital advertising is depicted. In the example of FIG. 1, an advertiser may have an ad campaign goal of new customer acquisition for a particular brand, and may therefore desire to present ads to consumers that are likely to become new customers of the advertised brand. In the example of FIG. 1, the advertised products may be earphones and headphones of a certain brand, and the advertiser may desire to acquire new customers for the brand. New customers may be defined as customers that have not purchased products associated with the brand, such as the headphones, within the past 12 months. In other embodiments, criteria for new customers may be defined by the advertiser.

Upon determining the goal of the ad campaign, one or more remote server(s) of the system may generate one or more algorithms to identify potential new customers for the brand in accordance with the ad campaign goals. To generate the one or more algorithms, the remote server(s) may determine a positive sample, or a set of customers that recently became new customers of the brand. For example, the remote server(s) may determine a number of product identifiers associated with the brand. The remote server(s) may analyze a purchase history of customers that recently purchased one or more of the product identifiers associated with the brand in order to determine whether the customers had previously purchased one of the identified products. In some embodiments, the remote server(s) may determine whether the customers had previously purchased one of the identified products within a predetermined time interval (e.g., 12 months, etc.). If the recent purchase of the product associated with the brand was a first purchase of a product associated with the brand, the remote server(s) may identify the user that made the purchase as a new to brand customer.

The remote server(s) may further determine, based at least in part on respective purchase histories, a negative sample, or a set of users that have not purchased a product associated with the brand. In some embodiments, the negative sample may include users that browsed products associated with the brand and/or users that bought competitive products. The positive and negative user samples may include the same or different numbers of users.

Based at least in part on the identified positive sample and negative sample of users, the remote server(s) may determine one or more features of the users in the respective user samples. For example, the remote server(s) may analyze browsing histories, user attributes, and other data, such as self-identified customer designations (e.g., self-identified moms or parents, etc.) or customers that are part of customer lists, which may be lists of customers having certain attributes (e.g., customers that made certain purchases, customers with certain preferences, etc.). By analyzing data associated with the positive and negative user samples, the remote server(s) may identify characteristics of the respective user samples, as well as interactions or patterns of interactions that users of the respective samples engaged in. The characteristics and interactions may be binned relative to time. For example, the remote server(s) may determine that a majority of the users of the positive user sample browsed products associated with the brand 3-6 months before making a purchase and clicked on an advertisement associated with the brand within 1 month before making a purchase of the product. In another example, the remote server(s) may determine that some of the users of the negative user sample browsed products associated with the brand 2-4 months before making a competitive product purchase, or that the users were presented with promotional offers of competitive products 0-1 week before making a purchase of a competitive product.

Upon identifying one or more features, the remote server(s) may select one or more features to include in a predictive model. For example, the remote server(s) may select about thirty features (e.g., how many times a user clicked on a product, whether a user viewed product reviews, how many times a user visited a product description, etc.) for evaluation with respect to the positive and negative user samples. Any number of features may be selected. Each individual feature may be evaluated by a discrete model in parallel, resulting in a reduced length of time for evaluation of the selected features. By evaluating thirty features independently in parallel, the time to complete each evaluation is reduced and an overall time to evaluate the selected features is therefore reduced. The outcome of each of the individual models may be merged to generate a single model, which may be a predictive purchase model or a predictive user behavior model. Logistical regression may be used, among other methods, to evaluate features and/or generate models. The outcome of the thirty individual models may be merged using averaging techniques, in one example.

Upon merging the individual models to generate the merged model, the predictive user behavior model may be trained and evaluated using the original positive and negative user samples. For example, the predictive user behavior model may be used to generate customer scores for each user in the data set. The users may be ranked based at least in part on the customer score, and the predictive user behavior model may apply a rule (e.g., a determination as to whether a customer score meets a threshold) to determine whether a user is likely to be a new to brand customer or meets a similarity threshold with respect to users in either the positive or negative user sets. The results of the predictive user behavior model may be compared to the actual known results to evaluate an accuracy of the predictive user behavior model. If the predictive user behavior model meets an accuracy threshold, such as 70%, 80%, or 90% accuracy, or accuracy as determined by another metric, the predictive user behavior model may be published.

The published predictive user behavior model may evaluate active users in real-time as the user browses a website, for example, and may generate a customer score for active users based at least in part on real-time interactions between the active user and the website. If the customer score meets a consumer segment modification threshold, the active user may be added to or removed from a consumer segment. For example, if the consumer segment modification threshold is set to a customer score of 7, and the active user has a customer score that changes from 6 to 7, the active user may be added to a consumer segment. Once the active user is added to a consumer segment, the active user may become eligible for ads associated with that particular consumer segment. Similarly, if the active user's customer score changes from 7 to 4, the active user may be removed from the consumer segment and may no longer be eligible for ads associated with the consumer segment. The remote server(s) may continuously monitor the active user's behaviors and continually update the active user's customer score.

In this manner, the predictive user behavior model may be implemented to make timely determinations as to whether an active user is likely to be a new to brand customer (or otherwise likely to satisfy the goal of a particular ad campaign), and can determine, in real-time, whether a user is eligible for an advertisement. As a result, embodiments of the disclosure may present ads to relevant users that are likely to react to the ad in a desired manner in order to satisfy the goals of an ad campaign.

For example, in FIG. 1 a user 100 (illustrated as User 1) may access a first user interface 120 with a user device 110. The user 100 may use the user device 110 to access and/or interact with one or more products, advertisements, or other digital content, such as websites. For example, the user 100 may search for and/or purchase items using the user device 110. The first user interface 120 may present one or more products for sale to the user 100. The user 100 may browse and/or interact with the available products. Interactions may include clicking on product, viewing a product for a certain length of time, hovering over a product, and other interactions. In FIG. 1, the first user interface 120 presents a number of headphones to the user 100. The user 100 may have searched for "headphones" at a searching user interface. The headphones presented at the first user interface 120 may be associated with an "electronics" consumer segment and an "audio" sub-segment.

The remote server(s) may have generated a predictive user behavior model for new to brand acquisitions for a brand associated with the "wireless headphones" illustrated at the first user interface 120. To generate the predictive user behavior model for the brand, the remote server(s) may have analyzed one or more customer profile database(s) 140. In this example, the customer profile database(s) 140 may be data associated with users that made a purchase of a product associated with the brand within the previous 3 months, and no purchases of products associated with the brand for the 9 months preceding the 3 month time interval (e.g., a single purchase of a product associated with the brand in the past year, where the purchase came within the previous 3 months). The customer profile database(s) 140 may include browsing behavior data 142, user attribute data 144, and customer lists 146. The customer profile database(s) 140 may include additional or fewer elements.

A predictive user segmentation engine 148 may evaluate the data of the customer profile database(s) 140 to generate the predictive user behavior model. Using the predictive user behavior model, a customer score determination engine 150 may determine, in real-time, a customer score for an active user based at least in part on the active user's actions, as well as data associated with the active user, such as a browsing or purchase history, user attributes, and the like.

For example, at the first user interface 120, the user 100 may be an active user. The user's last action may be browsing an electronics category as shown at the first user interface 120. The user 100 may not be a member of an electronics consumer segment at the time the user 100 is browsing the first user interface 120. The customer score determination engine 150 may determine a customer score of 4 for the user 100 based at least in part on the predictive user behavior model and the active user data. While described as a numerical value, customer scores may be any suited metric that reflects increase or decrease in likelihood an active user should be added or removed from a consumer segment. A consumer segment determination engine 152 may determine whether a consumer segment modification is necessary based on a current customer score. For example, the consumer segment determination engine 152 may determine whether a customer score meets the consumer segment modification threshold. At the first user interface, the consumer segment determination engine 152 may determine that the customer score of 4 does not meet a consumer segment modification threshold customer score of 8, in this example, and therefore the user 100 does not belong in the electronics consumer segment.

The user 100 may make a selection 130 of "wireless headphones," and may therefore proceed to a second user interface 122. The second user interface 122 may present product details for the wireless headphones. The second user interface 122 may present an option to purchase the wireless headphones 124 and an option to view product reviews 126, which may have been posted by other customers.

Some or all of the interactions between the user 100 and the user interface or website associated therewith may be monitored and/or stored. For example, while the user 100 is viewing the available headphone products at the first user interface 120, one or more remote server(s) may monitor the user's browsing behavior. The remote server(s) may determine that the user's last action was "browsing electronics" because the user 100 viewed the headphones presented at the first user interface 120.

While the user 100 is browsing the headphones at the first user interface 120, the remote server(s) may generate a real-time customer score. The real-time customer score may indicate a likelihood that an active user belongs to a consumer segment, depending on the goals of an ad campaign.

The customer score determination engine 150 may monitor the user's actions and the selection of the wireless headphones. Accordingly, the customer score determination engine 150 may determine that, based at least in part on the predictive user behavior model and the user's actions, that the last action the user 100 performed was viewing an electronics product, which may be the headphone product details illustrated at the second user interface 122. The customer score determination engine 150 may determine an updated customer score of 5, which is an increase from the previous score of 4. The customer score for the active user 100 may increase because the user's action of viewing product details may be interpreted as interest in the product according to the predictive user behavior model. The consumer segment determination engine 152 may determine that the customer score of 5 does not meet the consumer segment modification threshold customer score of 8, and therefore the user 100 does not belong in the electronics consumer segment. In other embodiments, the customer score may be decreased based at least in part on the user's actions.

The user 100 may make a selection 132 of the option to view product reviews 126. A third user interface 128 may be presented with a number of product reviews for the wireless headphones. Based at least in part on the user's selection 132, the customer score determination engine 150 may determine that the last user action was to view product reviews, as shown at the third user interface 128. A timer may indicate that the user viewed the product reviews for 4 minutes, which may be an indication the user read the product reviews. The customer score determination engine 150 may determine an updated customer score of 9 for the user 100. The increase in customer score from 5 to 9 may be due to the fact that viewing product reviews for a certain length of time was a strong indicator that a user may make a purchase of a product associated with the brand, as accounted for by the predictive user behavior model. For example, if an overwhelming number of customers that viewed product reviews for 2 or more minutes for products associated with the brand ended up making a purchase of a product associated with the brand, as determined based at least in part on the identified positive and negative user sets, viewing product reviews may be a strong indicator or signal that the user will make a purchase. Accordingly, the customer score for the user 100 may see a relatively large change.

The consumer segment determination engine 152 may determine that the customer score of 9 meets the consumer segment modification threshold, and may therefore initiate association of the user 100 with a target consumer segment 160, which may include users that are likely to be new customers of the brand. As illustrated, users in the target consumer segment 160 may be indicated by user identifiers. The user 100 may be added to the target consumer segment 160.

The target consumer segment 160 may be associated with target consumer segment candidate ads 170. For example, the target consumer segment candidate ads 170 may include ads associated with the brand, ads associated with a broader consumer segment such as electronics, or other ads that are targeted towards specific consumer segments, such as the target consumer segment 160. Ads associated with the target consumer segment candidate ads may be indicated by ad identifiers.

In the example of FIG. 1, the user 100 may not purchase the wireless headphones after viewing the product reviews at the third user interface 128. The user 100 may later browse to a fourth user interface 180 that may be unrelated to the wireless headphones. The fourth user interface 180 may be a sports information website, for example, and may have an available ad slot 190. A website/ad publisher server associated with the sports information website may conduct an auction process for the available ad slot 190. If the remote server(s) or an affiliated server wins the auction for the available ad slot 190, the remote server(s) may select an ad for presentation at the available ad slot 190. In FIG. 1, for example, the remote server(s) may win the auction for the available ad slot 190 and may select an ad from the target consumer segment candidate ads 170 for presentation to the user 100 because the user 100 is a part of the target consumer segment 160. As shown, Ad 1 may be selected from the target consumer segment candidate ads and presented to the user 100 at the available ad slot 190 via the fourth user interface 128. In some embodiments, the user 100 may be associated with multiple consumer segments and ads may be selected for presentation to the user 100 from any consumer segment associated with the user.

By generating customer scores in real-time and by monitoring active user actions and behaviors, embodiments of the disclosure can predict user actions based at least in part on historical analysis of targeted users, and may determine a correlation between an active user and likeminded known users. As a result, timely ads can be presented to relevant users and ad campaign goals can be effectively satisfied. Further, because users are associated with certain ads based on consumer segment membership, response times to bid requests may be reduced because a reduced number of ads may need to be evaluated before responding to a bid request. For example, if a bid must be submitted within 100 milliseconds of receiving a bid request, systems of the disclosure may be able to select an ad from a set of candidate advertisements instead of all available ads. Because the selection of an advertisement may include evaluation of factors such as ad-specific features, knowledge of user context (e.g., time of day, keywords on the webpage), and user features, embodiments of the disclosure may provide improved evaluation of candidate advertisements, in part, by removing non-relevant advertisements from consideration.

Example embodiments of the disclosure relate to systems, methods, computer-readable media, techniques, and methodologies for predictive user segmentation modeling and browsing interaction analysis for digital advertising. Accordingly, the systems, methods, computer-readable media, techniques, and methodologies described herein may optimally serve ad impressions, resulting in improved likelihood of presenting ad impressions to target consumers.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
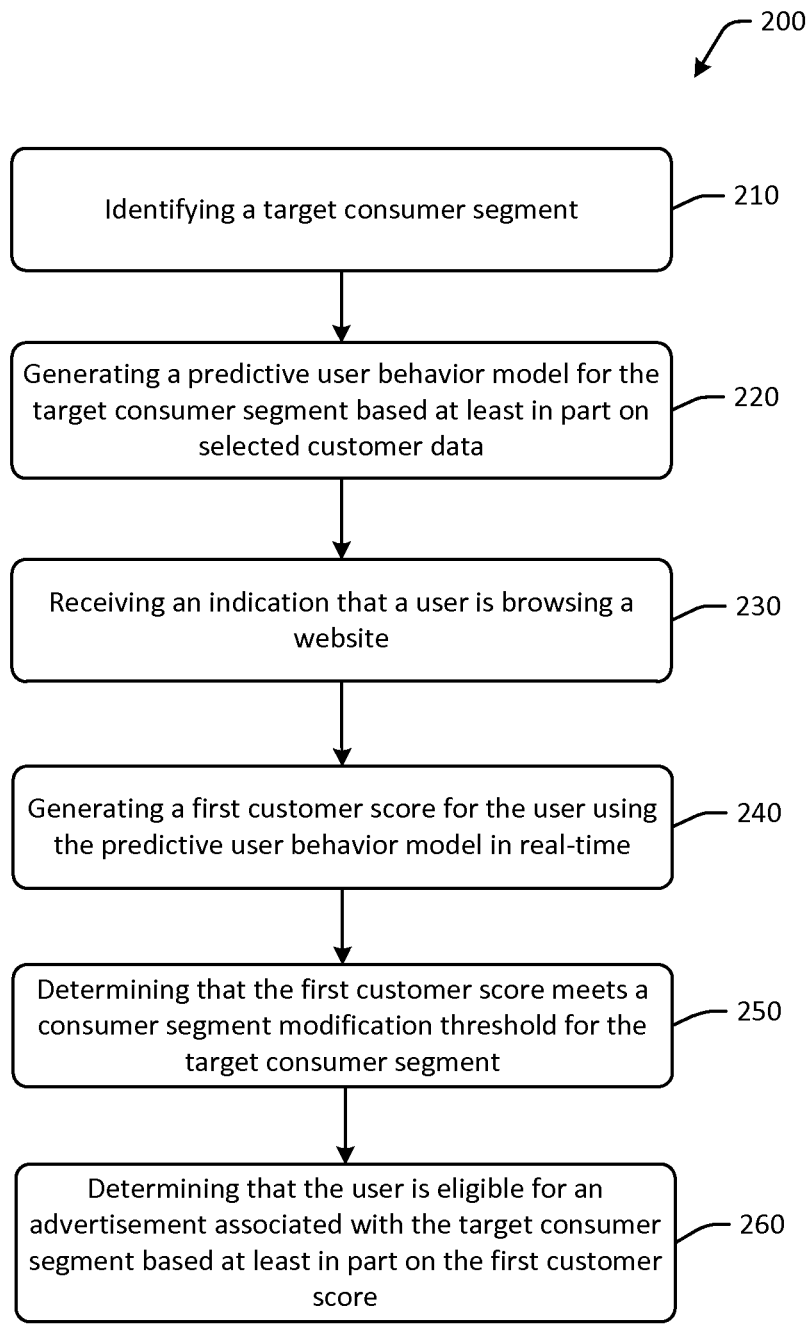
FIG. 2 is an example process flow diagram for predictive user segmentation modeling and browsing interaction analysis in accordance with one or more embodiments of the disclosure.

Referring now to FIGS. 2-7, an example process flow 200 is depicted in FIG. 2. Although certain operations are illustrated as occurring separately in FIG. 2 for clarity, some or all of the operations may occur concurrently or partially concurrently.

Block 210 of process flow 200 includes identifying a target consumer segment. The target consumer segment may be based at least in part on one or more goals of an ad campaign. For example, the target consumer segment may include users that purchased a particular product, browsed a certain category of products, clicked on a type of ad, read a certain article or type of article, or other desired target consumer segment. In a specific example, if the goal of an ad campaign is to acquire new customers, the target consumer segment may be users that have not purchased a particular product or any products associated with a particular brand. Users that have made purchases of the product or the brand may already be customers of the product or brand and may therefore not be included in the target consumer segment. The target consumer segment may be identified via analysis of some or all of an entire set of products or digital content a user has ever interacted with, or products or content a user has interacted with over a predetermined timeframe. Target consumer segments may be consumers that may purchase a particular product, purchase a particular brand, be a hiking enthusiast, or exhibit other preferences. For example, if the target consumer segment is a brand, embodiments of the disclosure may generate a set of product identifiers associated with the target product brand, and may select a set of customers that made a first-time purchase of a product associated with the target product brand within a predetermined time interval to generate selected customer data.

At block 220 of FIG. 2, the process flow 200 includes generating a predictive user behavior model, such as a predictive purchase model, for the target consumer segment based at least in part on the selected consumer data. For example, as described in detail in FIG. 3, a predictive user behavior model may be generated based at least in part on a goal or target of an ad campaign and may be based at least in part on browsing behaviors, user attributes, and/or customer lists.

Block 230 of the process flow 200 in FIG. 2 includes receiving an indication that a user is browsing a website. For example, an indication of an active user may be received from a website/ad publisher server. The active user may be identified via a user identifier, and user attributes and/or geographical information may be determined based at least in part on the user identifier, a device identifier, or other suitable identifier. In one example, a remote server may receive an indication that a user is viewing a website associated with a particular product or brand during a browsing session, and the remote server may determine that the user has not purchased the product during a predetermined time interval, such as one month. In this example, the goal of the ad campaign may be to reengage previous customers. Examples of browsing may include clicking, purchasing, listening, viewing, subscribing, hovering, and the like.

Block 240 of the process flow 200 includes generating a first customer score for the user using the predictive user behavior model in real-time. For example, after every event or interaction the user engages in, such as a click, hover, scroll, or the like, a customer score may be generated for the user. Accordingly, a customer score for the user may be continuously updated in real-time upon each action or behavior exhibited by the user. The first customer score may be a numerical value or other value such as an alphanumeric set of characters and may be indicative of a probability or likelihood that the active user for which the customer score is being generated is a candidate for the goals of the ad campaign. For example, if the goal of an ad campaign is to find users that will buy a particular brand of item, the customer score may reflect the likelihood an active user will buy the particular brand of item. In some embodiments, the customer score may be indicative of the likelihood that the active user is a member of a particular consumer segment. In one example, a remote server may calculate a customer score for a user using the predictive user behavior model.

Block 250 includes determining that the first customer score meets a consumer segment modification threshold for the target consumer segment. The consumer segment modification threshold may be set by an advertiser or may be dynamically adjustable, for example, based at least in part on a number of ad impressions that have been delivered compared to an optimal delivery schedule. For example, if the number of delivered ad impressions is less than the delivery schedule, the consumer segment modification threshold may be dynamically adjusted downwards to include more active users.

Consumer segment, user, and/or advertisement associations may be dynamic. If it is determined, based at least in part on the customer score meeting the consumer segment modification threshold, that the active user should be included in a particular consumer segment, a user identifier of the active user may be assigned to the consumer segment. The active user may therefore become eligible for ads associated with the consumer segment. If it is determined that the active user should not be included in the consumer segment, the active user may not be assigned to the consumer segment, or if the user was previously assigned to the consumer segment, the active user may be disassociated from the consumer segment. For example, if a user is assigned to a consumer segment and then makes a purchase of a product associated with the consumer segment, the user may be disassociated from the consumer segment if it is unlikely the user will make another purchase of a product associated with the consumer segment in the near future (e.g., 6 hours, 1 week, etc.). Users may be associated with a particular consumer segment for a period of time, until a particular event occurs (e.g., a purchase is made, etc.), until the user exhibits sufficiently distinct behavior, or for another reason.

At block 260, the process flow 200 includes determining that the user is eligible for an advertisement associated with target consumer segment based at least in part on the first customer score. In some embodiments, the process flow 200 may include sending an advertisement identifier for an advertisement associated with the target consumer segment. The advertisement identifier may be associated with an advertisement and may be used by a user device to render the advertisement. To select an advertisement for presentation to the user, in some embodiments, candidate advertisements may be determined by identifying the user to which the advertisement will be presented, the consumer segment(s) the user belongs to, the ad slot information from the bid request, and advertisements associated with the identified consumer segments. The candidate advertisements may include advertisements available for presentation. In some embodiments, candidate advertisements may be identified for some or all of the consumer segments a user is associated with, or for only a consumer segment that the user has the highest score for. Delivery goals for candidate ads may be considered in selecting an ad for presentation. For example, if a certain number of impressions are guaranteed to be delivered per hour for an ad campaign, an ad for that ad campaign may be presented if needed.

Figure 3:
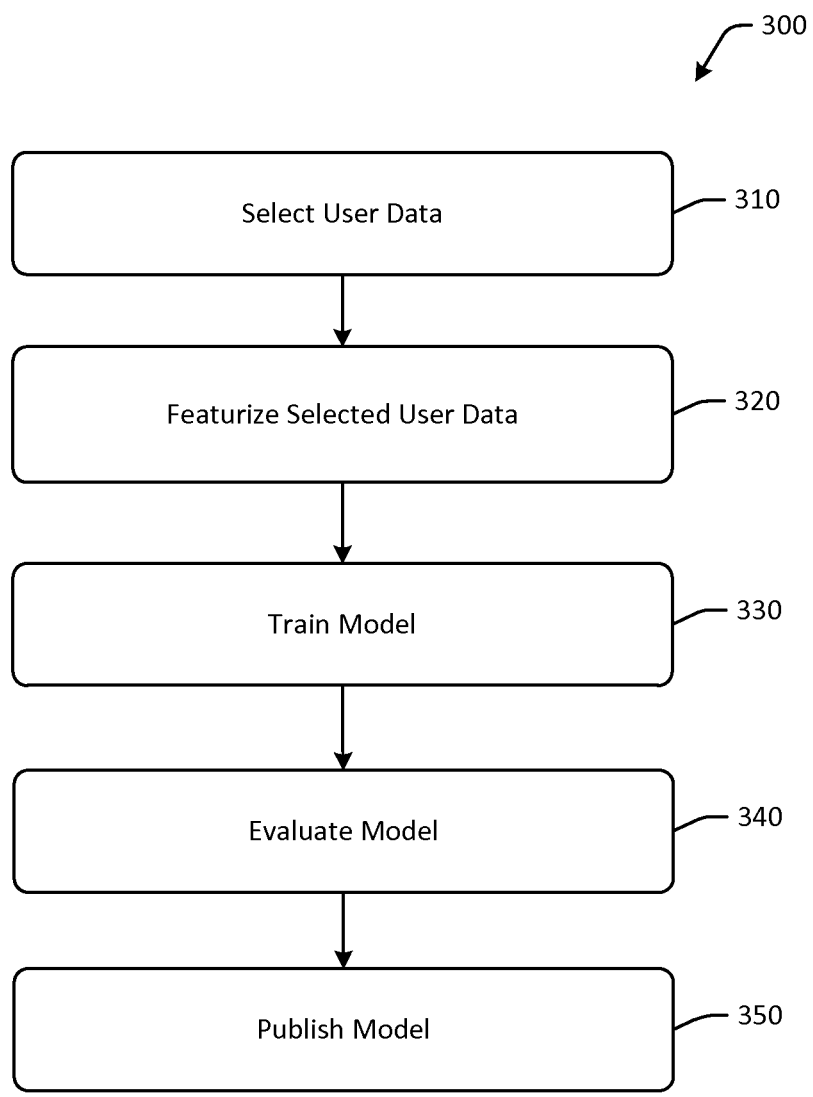
FIG. 3 is an example process flow diagram for predictive user segmentation modeling in accordance with one or more example embodiments of the disclosure.

Referring to FIG. 3, an example process flow 300 for generating a predictive user behavior model is depicted in accordance with one or more embodiments of the disclosure. At block 310, the process flow 300 includes selecting user data. User data may be selected by selecting a first set of users that purchased a product within a first time interval, and by selecting a second set of users that did not purchase the product within the first time interval. The selected user data may include a browsing history for one or more users, a purchase history for one or more users, and user attribute data for one or more users. In some embodiments, the selected user data may be analyzed to determine a first average number of interactions between the first set of user and a browse node associated with a product. The selected user data may be analyzed to determine a second average number of interactions between the first set of users and the website. The averaged values may be used to determine aggregate characteristics or interactions performed by users that either did or did not purchase a product or brand. For example, if the users that bought a product viewed the product website 4 times, on average, then if a new user views the product website 4 times, a likelihood that the new user will purchase the product may increase.

Certain embodiments of the disclosure may determine similarities between active users and known users, or users that made a purchase. For example, user attributes of a new user may be compared to user attributes of users in either the first or second user data sets to determine whether there is a correlation between the new user attribute data and the selected user attribute data, or whether a user similarity threshold is met or exceeded. The user similarity threshold may be representative of a match between certain user attributes or categories. For example, if some or all purchasers of a product were in a certain geographical location or within a certain age range, and a new user is within the same geographical location or the same age range, the new user may be more likely to purchase the product than a user than is not in the same location or age range. In addition, purchase histories of new users and selected users may be compared to determine whether a purchase history similarity threshold is met. The purchase history similarity threshold may be a percentage overlap of products or types of products purchased by a user compared to the selected users.

In some embodiments, a number of browse node (e.g., a set of webpages associated with a brand, product/service, or type of product/service, etc.) visits to browse nodes associated with a target consumer segment during a predetermined time interval by known customers may be compared to a new user's browsing behavior to determine whether a browsing similarity threshold is satisfied. For example, if previous purchasers visited a browse node 22 times before making a purchase, and the new user has made 22 visits, the new user may be relatively more likely to making a purchase than if the user had only made 5 visits to the browse node.

Block 320 includes featurizing the selected user data. For example, a first feature associated with the first set of customers may be determined, where the first feature is a number of browse node visits to a browse node associated with the product. A first number of interactions between the first customer and the browse node during a second time interval that precedes the first time interval may be determined. A second feature associated with the first set of customers, where the second feature is a number of product views at a website associated with the product during the second time interval may be determined. A second number of interactions between the first customer and the website during the second time interval may be determined. In some embodiments, products that a user interacted with during a time interval and/or during their entire respective histories may be determined. User attributes of each selected user sample may be evaluated. User attributes may be provided by the respective user and/or determined via user interaction. User attributes may include demographic information, geographic information, electronic and/or physical addresses, and other information.

At block 330, the process flow 300 includes training one or more models. For example, a first predictive model for the first feature and a second predictive model for the second feature may be generated. The models may be trained in parallel based at least in part on the first set of customers and the second set of customers. The models may be merged to generate the predictive user behavior model.

Block 340 includes evaluating a model. For example, the predictive user behavior model may be evaluated to determine that the predictive user behavior model meets an accuracy threshold, such as 70% or another metric.

At block 350, the model is published. The model may be used to evaluate active users in real-time during browsing sessions.

Figure 4:
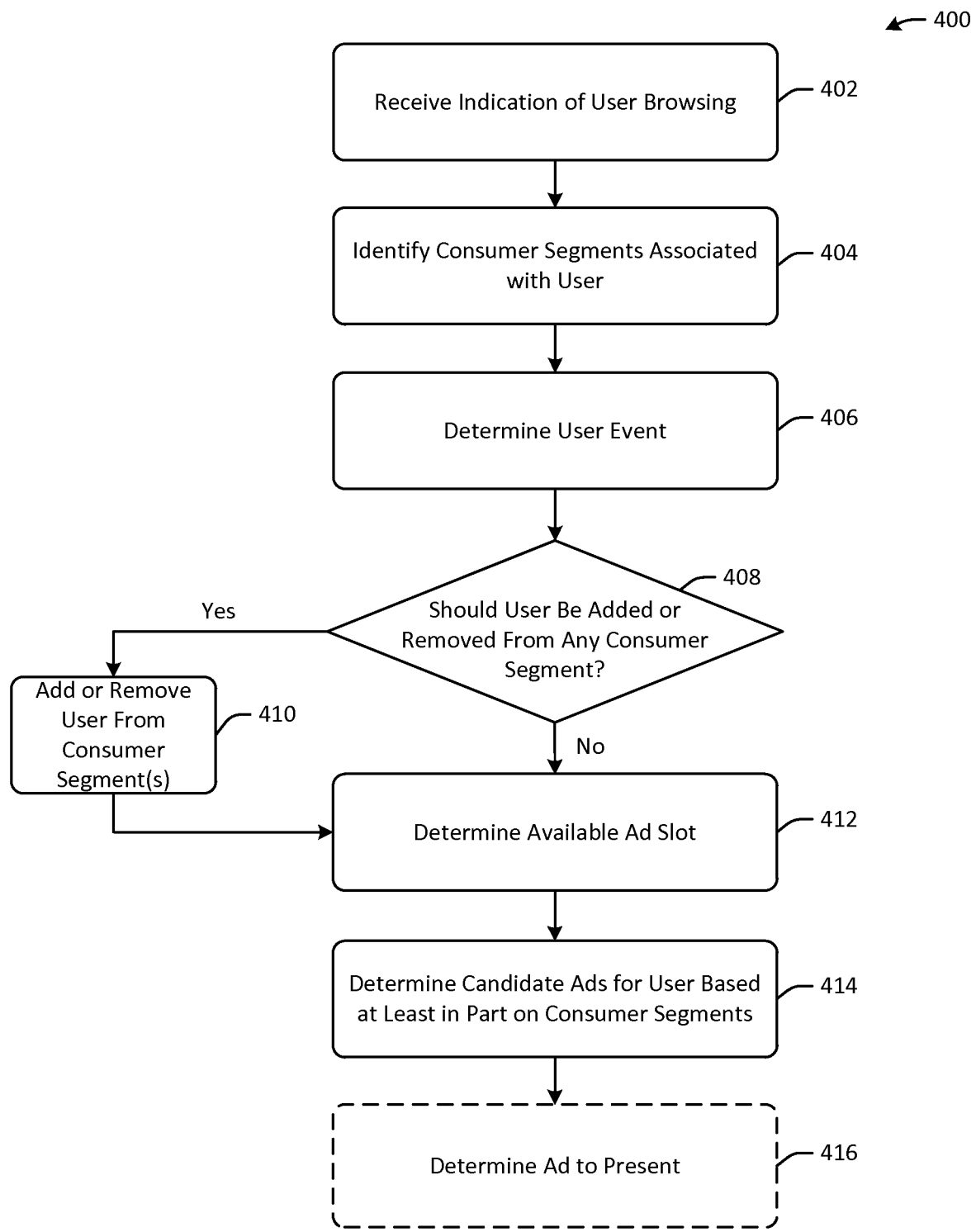
FIG. 4 is an example process flow diagram for browsing interaction analysis in accordance with one or more embodiments of the disclosure.

FIG. 4 depicts an example process flow 400 for real-time consumer segment modification and browsing interaction analysis in accordance with one or more embodiments of the disclosure. At block 402, an indication of a user browsing may be received. A user may browse a webpage or mobile application, for example, via any suitable client device. At block 404, consumer segments associated with the active user are identified, for example, based at least in part on a user identifier associated with the user. Consumer segments associated with the active user may be identified after each user action in some embodiments. For example, after each user click, all consumer segments that the active user is associated with may be recalculated. As a result, the active user may no longer be associated with certain consumer segments, and the active user may also be associated with certain consumer segments that the active user was not previously associated with. Such recalculations may occur in real-time as the user is browsing. At block 406, a user event is determined. User events, or user actions, may include browsing behaviors such as clicks, views, hover events, time of viewing, content consumption, product interaction, product purchases, at the like. At determination block 408, a determination is made as to whether the user should be added or removed from any consumer segment. For example, based at least in part on the monitored browsing behavior, a determination as to whether the user should be added to a consumer segment or removed from any existing consumer segment may be made. Such determinations may be made in real-time as the active user is browsing. Browsing behavior may be reflected in a customer score associated with the user, which may be updated in real-time as the user continues to browse or interact with digital content. Accordingly, a determination at determination block 408 may be based at least in part on a customer score for the user.

If it is determined at determination block 408 that the user should be added to or removed from a consumer segment, the process flow 400 may proceed to block 410, at which the user identifier associated with the user is associated or disassociated from one or more consumer segments, and the user is therefore added to or removed from the appropriate consumer segment. The process flow 400 continues to block 412.

If it is determined at determination block 408 that the user should not be added to or removed from any consumer segments, the process flow 400 may continue to block 412, at which an available ad slot is determined. For example, the user may be browsing a website and a banner ad slot may be available. In some embodiments, block 412 may be performed by another computer system, such as an ad optimization remote server.

At block 414, candidate ads for the available ad slot are determined for presentation to the user based at least in part on the consumer segments associated with the user. For example, if the user is associated with a gardening consumer segment, ads associated with gardening may be candidate ads.

At block 416, the determined ad is optionally presented to the user. For example, an ad identifier and/or ad creative may be sent to a user device for presentation to the user. In some embodiments, the determined ad may be presented by another computer system, such as an ad delivery remote server.

Figure 5:
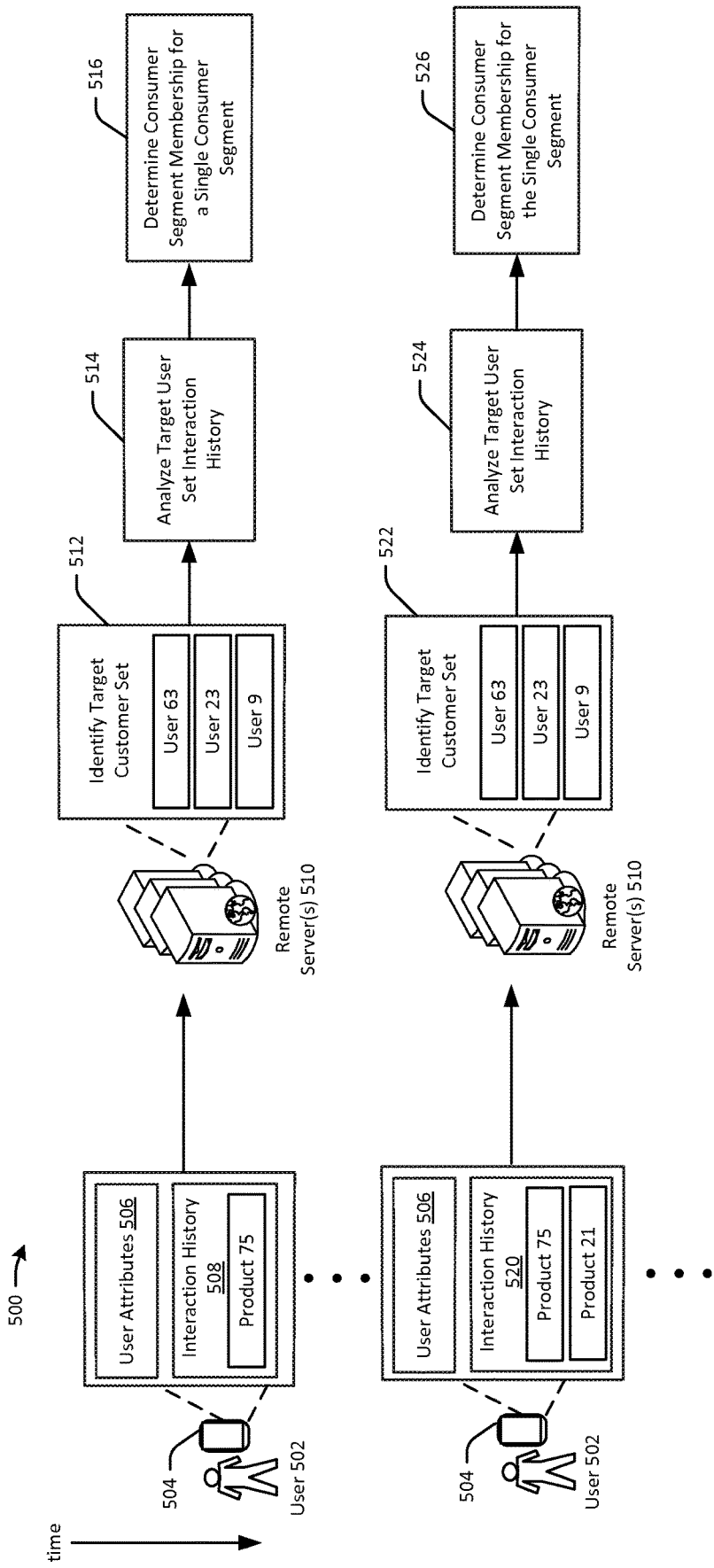
FIG. 5 schematically illustrates an example process flow over time for predictive user segmentation in accordance with one or more embodiments of the disclosure.

FIG. 5 schematically illustrates an example process flow over time for predictive user segmentation in accordance with one or more embodiments of the disclosure. In FIG. 5, embodiments of the disclosure may predict user segmentation and consumer segment associations for users based at least in part on interactions between a user and digital content compared to similar users. In FIG. 5, an example environment 500 is illustrated with a user 502 having a mobile device 504 in communication with one or more remote servers 510 via one or more networks. The user 502 may be associated with user attributes 506 and an interaction history 508 including an interaction item of Product 75. The user 502 may be relatively new, or a user for which an interaction history has not yet been developed or has limited interaction items. The remote server 510 may identify the user attributes 506 and the interaction history 508 via a user identifier associated with the user 502. The remote server 510 may determine that the interaction history 508 has less than a designated number of interaction items, such as 5 interaction items. The remote server 510, in response, may identify users similar to the user 502 based at least in part on the user attributes 506 of the user 502 at operation 512. For example, the remote server 510 may determine that User 63, User 23, and User 9 are all similar to the user 502 in that each identified user shares a similarity in a majority of user attributes, such as age, demographics, geographic location, and the like. The remote server 510 may rank the identified users according to level of similarity. At operation 514, the remote server 510 may analyze a target customer set interaction history of the identified users to determine commonalities amongst the users. The remote server 510 may determine consumer segment membership for a single, specific consumer segment for the user 504 based on the target user set data to associate with user 502 at operation 516.

As the user 502 interacts with additional items reflected in a subsequent interaction history 520, the remote server 510 may identify similar users based on user attributes 506 at operation 522, and may analyze a target customer set interaction history at operation 524 to determine whether the consumer segments assigned to user 502 are still accurate. In FIG. 5, the user 502 may interact with Product 21, and as a result, the user with the most similar interaction history may be User 23. At operation 526, the remote server 510 may determine consumer segment membership for the single, specific consumer segment for the user 504 based on the updated interaction history and the target customer data set. The remote server 510 may continue this iterative process until the user 502 has established an interaction history sufficient to generate custom consumer segment associations.

Figure 6:
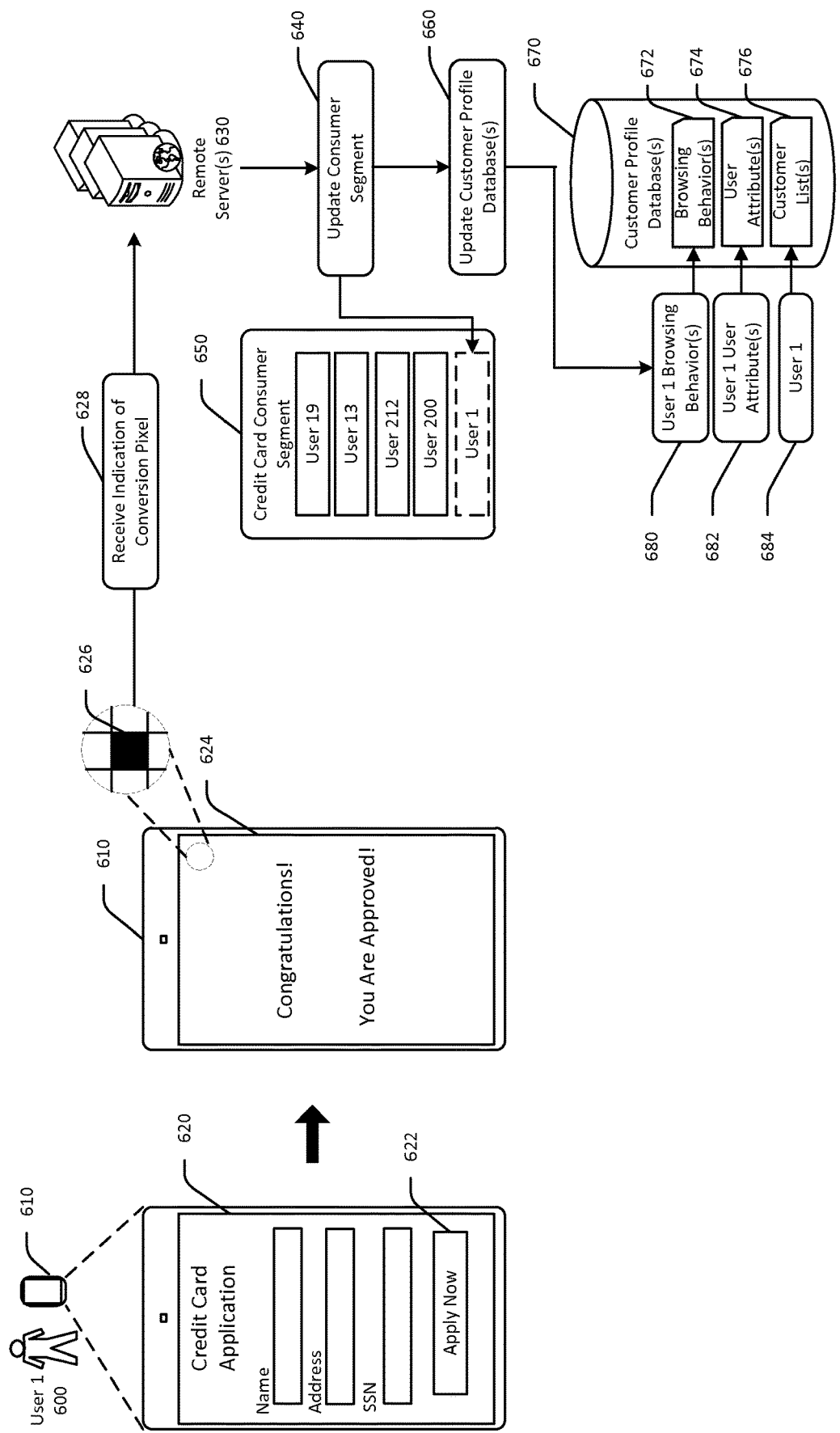
FIG. 6 schematically illustrates an example pixel conversion use case for predictive user segmentation in accordance with one or more embodiments of the disclosure.

FIG. 6 schematically illustrates an example pixel conversion use case for predictive user segmentation in accordance with one or more embodiments of the disclosure. In FIG. 6, an example pixel conversion use case is depicted, including a user 600 with a user device 610 in communication with one or more remote server(s) 630 via one or more networks. The user 600 may view, consume, or otherwise interact with digital content 620 on a display of the user device 610. The digital content 620 may be a credit card application. While consuming the digital content 620, or while filling out the credit card application, the user 600 may interact with one or more elements of the digital content 620. An interaction history of the user 600 may be monitored and/or stored or otherwise tracked. The interaction history may be associated with a user identifier that is associated with the user 600 and/or the user device 610. In FIG. 6, the user 600 may complete the credit card application and may submit the application via option 622.

The user 600 may be approved for the credit card and may be presented with an approval user interface 624. The approval user interface 624 may indicate to the user 600 that the credit card application submitted by the user 600 has been approved for the credit card. The approval user interface 624 may include a conversion pixel 626 that is presented at the user device 610. The conversion pixel 626 may send a signal or indication to the remote server(s) 630 that the conversion pixel 626 has been rendered. At operation 628, the remote server(s) 630 may receive an indication of the conversion pixel.

Upon receiving the indication that the conversion pixel 626 has been rendered, the remote server(s) 630 may determine that the user 600 was approved for the credit card. Because a location of the conversion pixel 626 is known (e.g., the conversion pixel is located at a particular user interface, such as the approval user interface 624), the remote server(s) 630 may determine that the user 600 was approved. If the conversion pixel were placed elsewhere, such as at the digital content 620 interface, the remote server(s) 630 may only determine that the user 600 wanted to fill out a credit card application.

The remote server(s) 630 may update one or more consumer segments associated with the user 600 at operation 640. For example, the user may be added to a credit card consumer segment that includes users that were recently approved for credit cards. The remote server(s) 630 may update one or more customer profile database(s) at operation 660. For example, the remote server(s) 630 may update a customer profile database(s) 670 that is associated with the credit card consumer segment 650 to include the user 600 data. The customer profile database(s) 670 may be updated to include browsing behavior data 680 associated with the user 600 as part of browsing behaviors 672 for aggregate members of the credit card consumer segment. Similarly, the user attributes 674 for the overall segment members may be updated to include the user's user attributes 682. Customer lists 676 of the aggregate customer profile database(s) 670 may be updated to include the user 600. Accordingly, aggregate data for all of the members of the credit card consumer segment 670 may be readily available.

While illustrated in one example embodiment in FIG. 6, in another embodiment, a third party may provide data regarding certain customers with particular attributes (e.g., customers that have been approved for a credit card, etc.). In such embodiments, signals provided by conversion pixels may be used in addition to data provided by third parties to enhance accuracy of customer matches.

Figure 7:
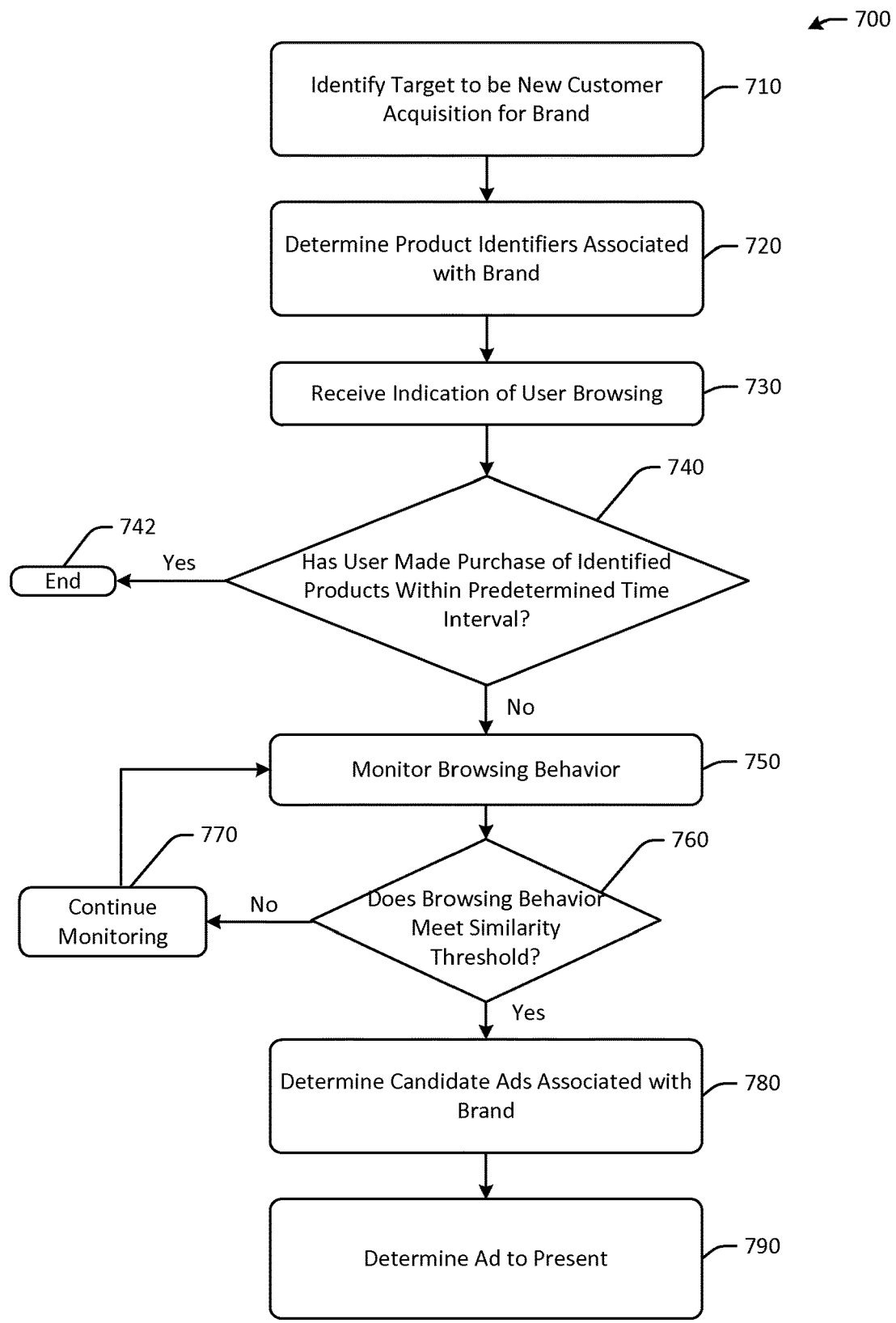
FIG. 7 schematically illustrates an example process flow for new customer acquisitions in accordance with one or more embodiments of the disclosure.

FIG. 7 schematically illustrates an example process flow 700 for new customer acquisitions in accordance with one or more embodiments of the disclosure. At block 710, a target of new customer acquisitions for a brand is identified. At block 720, product identifiers associated with the brand are determined. At block 730, an indication of a user browsing is received. At determination block 740, a determination is made as to whether a user made a purchase of any of the identified products within a predetermined time interval. If it is determined that the user made a purchase of at least one of the identified products, the process flow 700 continues to an end at block 742 because the user is not eligible as a new to brand customer.

If it is determined at determination block 740 that the user has not made a purchase of any of the identified products within the predetermined time interval, the process flow 700 continues to block 750, at which browsing behavior of the user is monitored.

At determination block 760, a determination is made as to whether the user's browsing behavior meets a similarity threshold compared to an average browsing behavior of actual new to brand customers. For example, if each actual new to brand customer clicked on product reviews and spent 5 minutes reading the reviews, if the user also clicks on product reviews and spends 5 minutes reading the reviews, a similarity between the user's browsing behavior and actual new to brand customers may be relatively high. The similarity threshold may be represented as a percentage match or other value.

If it is determined that the user's browsing behavior does not meet the similarity threshold, the process flow 700 may continue to block 770, at which the user's browsing behavior is continually monitored and the process flow 700 returns to block 750. If it is determined that the user's browsing behavior meets the similarity threshold, the process flow 700 may continue to block 780, at which candidate ads associated with the brand are determined. At block 790, an ad is determined for presentation. Accordingly, users that are likely to be new to brand customers may be targeted with timely ads.

Illustrative Computer Architecture

Figure 8:
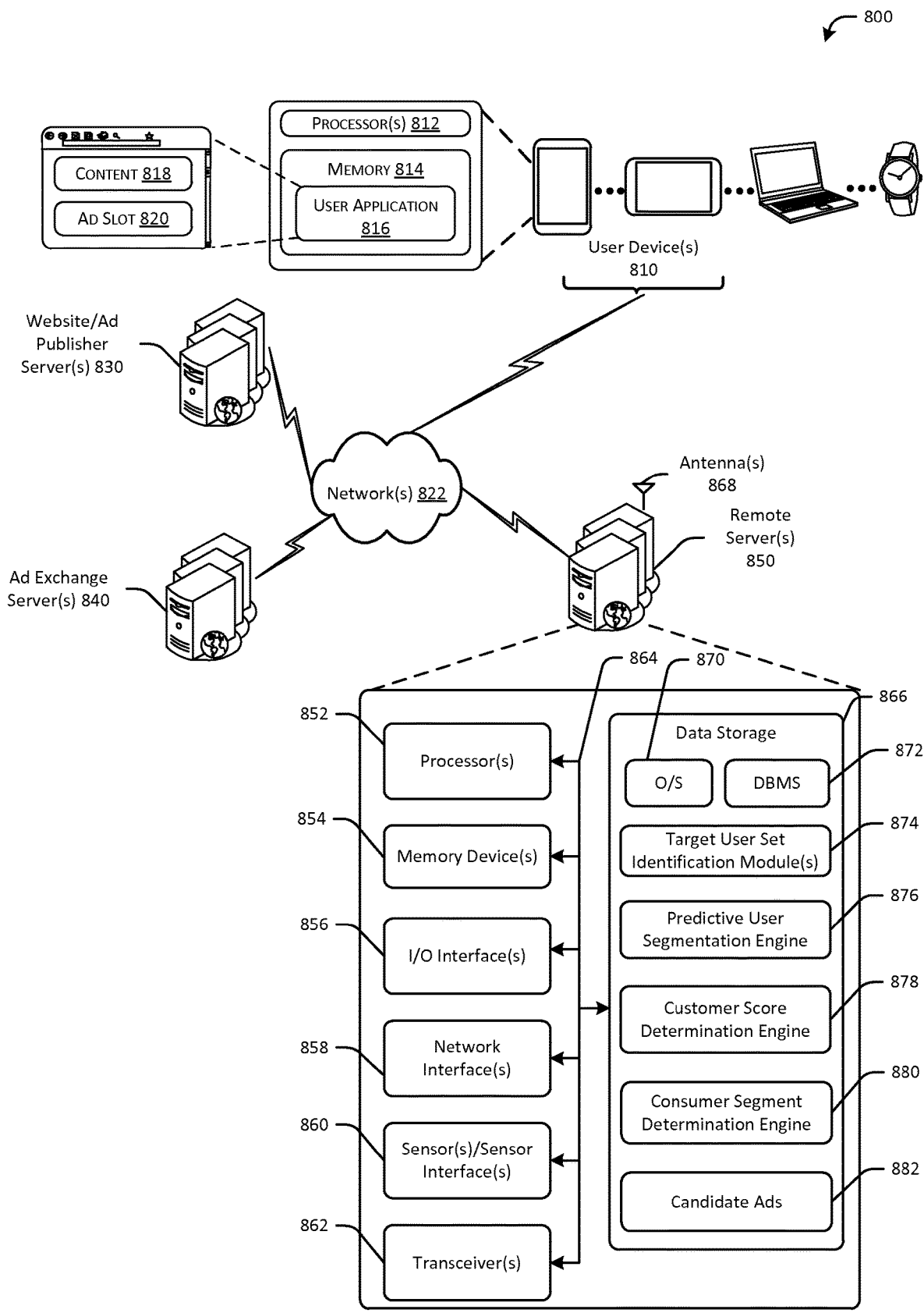
FIG. 8 schematically illustrates an example architecture of a system in accordance with one or more embodiments of the disclosure.

Referring now to FIG. 8, an example computer network architecture 800 is depicted. FIG. 8 includes an example user device 810, an example website/ad publisher server(s) 830, an example ad exchange server(s) 840, and an example remote server(s) 850, as described herein. While a single remote server(s) 850 is illustrated, a fleet of two or more servers may include one or more of the modules illustrated as part of remote server(s) 850. In some embodiments, a fleet of servers may process information concurrently or partially concurrently. Each component may be connected via one or more network(s) 822.

The network(s) 822 may include, but are not limited to, any one or more different types of suitable communications networks, such as cable networks, the Internet, wireless networks, cellular networks, or other private and/or public networks. Further, the network(s) 822 may include any type of medium over which network traffic may be carried including, but not limited to, coaxial cable, twisted-pair wire, optical fiber, hybrid fiber coaxial (HFC), microwave terrestrial transceivers, a radio frequency communication medium, a satellite communication medium, or any combination thereof.

Referring now to the user device 810, the user device 810 includes one or more processor(s) 812 and one or more memory devices 814 with a user application 816 stored thereon. The user device 810 may also include various additional components, such as one or more input device(s), I/O interface(s), radio/antennas, network interface(s), and other components. The user device 810 may also include an operating system configured to provide an interface between software and hardware resources of the user device 810, and/or database management systems configured to support functionality of the memory 814. The user device 810 may include system busses that functionally couple various components of the user device 810. In other embodiments, the user device 810 may include additional or fewer components.

The memory 814 may include one or more program modules, applications, or the like, such as the user application 816. One or more user applications 816 may be loaded into the memory 814. The user applications 816 may be any application(s) capable of facilitating the display of or otherwise presenting advertisement impressions to a user. The user applications 816 may include, but are not limited to, a web-based browser application, a dedicated software application (e.g., a smart phone application, a tablet application, etc.), a mobile browser application, and so forth. The user application 816 may be configured to render web pages on a respective user device. The web pages may include an advertisement presented in an available advertising slot 820 and/or other content 818 viewable by a user. Any data may be loaded into the memory 814 for use by the processor(s) 812 in executing computer-executable code. The user device 810 may be configured to access, store, and/or retrieve data in or from one or more datastore(s). The user device 810 may also include communications connection(s) that allow the user device 810 to communicate with datastores, other computing devices or servers, user terminals, and/or other devices via the network(s) 822.

The user device 810 may be any suitable user device including, but not limited to, a mobile device such as a smartphone, tablet, e-reader, or the like; a desktop computer; a laptop computer, a game console, a personal media player, a wearable computer device, and so forth. The user device 810 may be configured to present or serve ad impressions to users. The user device 810 may be configured to operate in various operational modes and may be configured to present electronic content and ad impressions.

The website/ad publisher server(s) 830 may include one or more processors and/or memory devices and may be configured to communicate with the ad exchange server(s) 840 via the network 822. The website/ad publisher server(s) 830 may communicate ad slot availability and may receive ad impression information for presentation in ad slots. The ad exchange server(s) 840 may include one or more processors and/or memory devices and may be configured to conduct auctions for available ad slots by generating and sending bid requests to connected entities, such as the remote server(s) 850, which may be the remote server(s) of other figures described herein.

The remote server(s) 850 may be configured to communicate via one or more network(s) 822. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MAN's), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server(s) 850 may include one or more processors (processor(s)) 852, one or more memory devices 854 (generically referred to herein as memory 854), one or more input/output ("I/O") interface(s) 856, one or more network interfaces 858, one or more sensors or sensor interfaces 860, one or more transceivers 862, and data storage 866. The remote server(s) 850 may further include one or more buses 864 that functionally couple various components of the remote server(s) 850. The remote server(s) 850 may further include one or more antennas 868 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 864 may include at least one of a system bus, a memory bus, an address bus, or a message bus, and may permit exchange of information (e.g., data (including computer-executable code), signaling, etc.) between various components of the remote server(s) 850. The bus(es) 864 may include, without limitation, a memory bus or a memory controller, a peripheral bus, an accelerated graphics port, and so forth. The bus(es) 864 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 854 of the remote server(s) 850 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 854 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 854 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 866 may include removable storage and/or non-removable storage including, but not limited to, magnetic storage, optical disk storage, and/or tape storage. The data storage 866 may provide non-volatile storage of computer-executable instructions and other data. The memory 854 and the data storage 866, removable and/or non-removable, are examples of computer-readable storage media (CRSM) as that term is used herein.

The data storage 866 may store computer-executable code, instructions, or the like that may be loadable into the memory 854 and executable by the processor(s) 852 to cause the processor(s) 852 to perform or initiate various operations. The data storage 866 may additionally store data that may be copied to memory 854 for use by the processor(s) 852 during the execution of the computer-executable instructions. Moreover, output data generated as a result of execution of the computer-executable instructions by the processor(s) 852 may be stored initially in memory 854, and may ultimately be copied to data storage 866 for non-volatile storage.

More specifically, the data storage 866 may store one or more operating systems (O/S) 870; one or more database management systems (DBMS) 872; and one or more program modules, applications, engines, computer-executable code, scripts, or the like such as, for example, one or more target user set identification module(s) 874, one or more predictive user segmentation engine(s) 876, one or more customer score determination engine(s) 878, one or more consumer segment determination engine(s) 880, and one or more candidate ad(s) 882. Some or all of these modules may be sub-modules. Any of the components depicted as being stored in data storage 866 may include any combination of software, firmware, and/or hardware. The software and/or firmware may include computer-executable code, instructions, or the like that may be loaded into the memory 854 for execution by one or more of the processor(s) 852. Any of the components depicted as being stored in data storage 866 may support functionality described in reference to correspondingly named components earlier in this disclosure.

The data storage 866 may further store various types of data utilized by components of the remote server(s) 850.

Any data stored in the data storage 866 may be loaded into the memory 854 for use by the processor(s) 852 in executing computer-executable code. In addition, any data depicted as being stored in the data storage 866 may potentially be stored in one or more datastore(s) and may be accessed via the DBMS 872 and loaded in the memory 854 for use by the processor(s) 852 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 852 may be configured to access the memory 854 and execute computer-executable instructions loaded therein. For example, the processor(s) 852 may be configured to execute computer-executable instructions of the various program modules, applications, engines, or the like of the remote server(s) 850 to cause or facilitate various operations to be performed in accordance with one or more embodiments of the disclosure. The processor(s) 852 may include any suitable processing unit capable of accepting data as input, processing the input data in accordance with stored computer-executable instructions, and generating output data. The processor(s) 852 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 852 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 852 may be capable of supporting any of a variety of instruction sets.

Referring now to functionality supported by the various program modules depicted in FIG. 8, the target user set identification module(s) 874 may include computer-executable instructions, code, or the like that responsive to execution by one or more of the processor(s) 852 may perform functions including, but not limited to, identifying positive and negative user samples for generating predictive models.

The predictive user segmentation engine(s) 876 may include computer-executable instructions, code, or the like that responsive to execution by one or more of the processor(s) 852 may perform functions including, but not limited to, generating predictive user behavior models and for evaluating and training models.

The customer score determination engine(s) 878 may include computer-executable instructions, code, or the like that responsive to execution by one or more of the processor(s) 852 may perform functions including, but not limited to, generating customer scores for users in real-time.

The consumer segment determination engine(s) 880 may include computer-executable instructions, code, or the like that responsive to execution by one or more of the processor(s) 852 may perform functions including, but not limited to, determining consumer segment modification thresholds and determining whether users should be added to or removed from consumer segments.

The candidate ad(s) 882 may include computer-executable instructions, code, or the like that responsive to execution by one or more of the processor(s) 852 may perform functions including, but not limited to, identifying candidate ads associated with consumer segments and determining which ads to present.

Referring now to other illustrative components depicted as being stored in the data storage 866, the O/S 870 may be loaded from the data storage 866 into the memory 854 and may provide an interface between other application software executing on the remote server(s) 850 and hardware resources of the remote server(s) 850. More specifically, the O/S 870 may include a set of computer-executable instructions for managing hardware resources of the remote server(s) 850 and for providing common services to other application programs (e.g., managing memory allocation among various application programs). In certain example embodiments, the O/S 870 may control execution of the other program modules to dynamically enhance characters for content rendering. The O/S 870 may include any operating system now known or which may be developed in the future including, but not limited to, any server operating system, any mainframe operating system, or any other proprietary or non-proprietary operating system.

The DBMS 872 may be loaded into the memory 854 and may support functionality for accessing, retrieving, storing, and/or manipulating data stored in the memory 854 and/or data stored in the data storage 866. The DBMS 872 may use any of a variety of database models (e.g., relational model, object model, etc.) and may support any of a variety of query languages. The DBMS 872 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 850 is a mobile device, the DBMS 872 may be any suitable light-weight DBMS optimized for performance on a mobile device.

Referring now to other illustrative components depicted as being stored in the data storage 866, the O/S 870 may be loaded from the data storage 866 into the memory 854 and may provide an interface between other application software executing on the remote server(s) 850 and hardware resources of the remote server(s) 850. More specifically, the O/S 870 may include a set of computer-executable instructions for managing hardware resources of the remote server(s) 850 and for providing common services to other application programs (e.g., managing memory allocation among various application programs). In certain example embodiments, the O/S 870 may control execution of one or more of the program modules depicted as being stored in the data storage 866. The O/S 870 may include any operating system now known or which may be developed in the future including, but not limited to, any server operating system, any mainframe operating system, or any other proprietary or non-proprietary operating system.

The DBMS 872 may be loaded into the memory 854 and may support functionality for accessing, retrieving, storing, and/or manipulating data stored in the memory 854 and/or data stored in the data storage 866. The DBMS 872 may use any of a variety of database models (e.g., relational model, object model, etc.) and may support any of a variety of query languages. The DBMS 872 may access data represented in one or more data schemas and stored in any suitable data repository. In certain example embodiments, the DBMS 872 may be any suitable light-weight DBMS optimized for performance on a mobile device.

Referring now to other illustrative components of the remote server(s) 850, the input/output (I/O) interface(s) 856 may facilitate the receipt of input information by the remote server(s) 850 from one or more I/O devices as well as the output of information from the remote server(s) 850 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 850 or may be separate. The I/O devices may further include, for example, any number of peripheral devices such as data storage devices, printing devices, and so forth.

The I/O interface(s) 856 may also include an interface for an external peripheral device connection such as universal serial bus (USB), FireWire, Thunderbolt, Ethernet port or other connection protocol that may connect to one or more networks. The I/O interface(s) 856 may also include a connection to one or more of the antenna(s) 868 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The remote server(s) 850 may further include one or more network interfaces 858 via which the remote server(s) 850 may communicate with any of a variety of other systems, platforms, networks, devices, and so forth.

The antenna(s) 868 may include any suitable type of antenna depending, for example, on the communications protocols used to transmit or receive signals via the antenna(s) 868. Non-limiting examples of suitable antennas may include directional antennas, non-directional antennas, dipole antennas, folded dipole antennas, patch antennas, multiple-input multiple-output (MIMO) antennas, or the like. The antenna(s) 868 may be communicatively coupled to one or more transceivers 862 or radio components to which or from which signals may be transmitted or received.

As previously described, the antenna(s) 868 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 868 may additionally, or alternatively, include a Wi-Fi antenna configured to transmit or receive signals in accordance with established standards and protocols, such as the IEEE 802.11 family of standards, including via 2.4 GHz channels (e.g. 852.11b, 852.11g, 852.11n), 5 GHz channels (e.g. 852.11n, 852.11ac), or 60 GHZ channels (e.g. 852.11ad). In alternative example embodiments, the antenna(s) 868 may be configured to transmit or receive radio frequency signals within any suitable frequency range forming part of the unlicensed portion of the radio spectrum.

The antenna(s) 868 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 862 may include any suitable radio component(s) for—in cooperation with the antenna(s) 868—transmitting or receiving radio frequency (RF) signals in the bandwidth and/or channels corresponding to the communications protocols utilized by the remote server(s) 850 to communicate with other devices. The transceiver(s) 862 may include hardware, software, and/or firmware for modulating, transmitting, or receiving—potentially in cooperation with any of antenna(s) 868—communications signals according to any of the communications protocols discussed above including, but not limited to, one or more Wi-Fi and/or Wi-Fi direct protocols, as standardized by the IEEE 852.11 standards, one or more non-Wi-Fi protocols, or one or more cellular communications protocols or standards. The transceiver(s) 862 may further include hardware, firmware, or software for receiving GNSS signals. The transceiver(s) 862 may include any known receiver and baseband suitable for communicating via the communications protocols utilized by the remote server(s) 850. The transceiver(s) 862 may further include a low noise amplifier (LNA), additional signal amplifiers, an analog-to-digital (A/D) converter, one or more buffers, a digital baseband, or the like.

The sensor(s)/sensor interface(s) 860 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 8 as being stored in the data storage 866 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the remote server(s) 850, and/or hosted on other computing device(s) accessible via one or more networks, may be provided to support functionality provided by the program modules, applications, or computer-executable code depicted in FIG. 8 and/or additional or alternate functionality. Further, functionality may be modularized differently such that processing described as being supported collectively by the collection of program modules depicted in FIG. 8 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 8 may be implemented, at least partially, in hardware and/or firmware across any number of devices.

It should further be appreciated that the remote server(s) 850 may include alternate and/or additional hardware, software, or firmware components beyond those described or depicted without departing from the scope of the disclosure. More particularly, it should be appreciated that software, firmware, or hardware components depicted as forming part of the remote server(s) 850 are merely illustrative and that some components may not be present or additional components may be provided in various embodiments. While various illustrative program modules have been depicted and described as software modules stored in data storage 866, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods, process flows, and use cases of FIGS. 1-7 may be performed by a device having the illustrative configuration depicted in FIG. 8, or more specifically, by one or more engines, program modules, applications, or the like executable on such a device. It should be appreciated, however, that such operations may be implemented in connection with numerous other device configurations.

The operations described and depicted in the illustrative methods and process flows may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms.

The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

identifying, by one or more computer processors coupled to at least one memory, a product for which to generate a predictive purchase model;

selecting a first set of users comprising a first user, wherein the first user purchased the product within a first time interval;

selecting a second set of users comprising a second user, wherein the second user did not purchase the product within the first time interval;

determining a first historical element associated with the first set of users, wherein the first historical element is a number of browse node visits to a browse node associated with the product;

determining a first number of interactions between the first user and the browse node during a second time interval that precedes the first time interval;

determining a second historical element associated with the first set of users, wherein the second historical element is a number of product views at a website during the second time interval;

determining a second number of interactions between the first user and the website during the second time interval;

identifying a target consumer segment that comprises users that purchased the product;

generating the predictive purchase model for the target consumer segment based at least in part on selected user data, the first historical element, the second historical element, the first number of interactions, and the second number of interactions;

generating a set of product identifiers associated with the product;

determining that the website is associated with the purchase of the product;

determining, using a set of test data, that the predictive purchase model meets an accuracy threshold;

receiving a first indication that a first new user is viewing the website during a browsing session;

determining that the first new user has not purchased the product during a third time interval;

calculating a first customer score for the first new user using the predictive purchase model in real-time;

monitoring a browsing behavior of the first new user;

comparing the browsing behavior of the first new user to the first historical element;

determining that the browsing behavior satisfies a browsing similarity threshold;

determining an optimal delivery schedule, wherein the optimal delivery schedule comprises an optimal number of delivered impressions;

determining a consumer segment modification threshold based at least in part on a number of previously delivered impressions relative to the optimal delivery schedule;

determining that the first customer score meets the consumer segment modification threshold;

assigning the first new user to the target consumer segment;

determining an advertisement identifier for an advertisement associated with the product;

causing presentation of an impression associated with the advertisement identifier at a user device associated with the first new user;

identifying a first purchase history of the first new user included in the selected user data, wherein the first purchase history comprises a purchase after presentation of the impression;
comparing a second purchase history of the first user to the first purchase history;
determining that the second purchase history satisfies a purchase history similarity threshold; and
updating the predictive purchase model based at least in part on the determination that the second purchase history satisfies the purchase history similarity threshold.

2. The method of claim 1, wherein the product is a first product, and the method further comprising:
receiving a second indication in real-time that the first new user purchased a second product;
determining that the second product is within the browse node;
calculating a second customer score for the first new user using the predictive purchase model in real-time;
determining that the second customer score is below the consumer segment modification threshold; and
disassociating the first new user from the target consumer segment.

3. The method of claim 1, further comprising:
identifying first user attribute data associated with the first new user;
identifying second user attribute data associated with a second new user; and
determining that a correlation between the first user attribute data and the second user attribute data meets a user similarity threshold.

4. The method of claim 1, further comprising:
determining that a first average number of interactions between the first set of users and the browse node is equal to or greater than the first number of interactions; and
determining that a second average number of interactions between the first set of users and the website is equal to or greater than the second number of interactions.

5. A method comprising:
generating, by one or more computer processors coupled to at least one memory, a predictive user behavior model for a target consumer segment based at least in part on selected user data, wherein the selected user data comprises a browsing history for one or more users, a purchase history for the one or more users, and user attribute data for the one or more users, wherein the target consumer segment comprises a target product brand;
generating a set of product identifiers associated with the target product brand;
determining a first set of users that made a first-time purchase of a product associated with the target product brand within a predetermined time interval to generate the selected user data;
determining that a first website is associated with purchases from the target product brand;
receiving an indication that a first user is browsing the first website;
generating a first customer score for the first user using the predictive user behavior model in real-time;
determining an optimal delivery schedule, wherein the optimal delivery schedule comprises an optimal number of delivered impressions;
determining a consumer segment modification threshold based at least in part on a number of previously delivered impressions relative to the optimal delivery schedule;
determining that the first customer score meets the consumer segment modification threshold for the target consumer segment;
determining a first number of browse node visits to a first plurality of browse nodes associated with the target consumer segment during a predetermined time interval by the first user included in the selected user data, wherein respective browse nodes comprise a set of webpages associated with at least one of a brand, a product or service, or a type of product or service;
determining a browsing behavior of the first user;
comparing the browsing behavior of the first user to the first number of browse node visits;
determining that the browsing behavior satisfies a browsing similarity threshold;
associating the first user with the target consumer segment;
determining an advertisement identifier for an advertisement associated with the target consumer segment;
causing presentation of an impression associated with the advertisement identifier at a user device associated with the first user;
identifying a first purchase history of the first user included in the selected user data, wherein the first purchase history comprises a purchase after presentation of the impression;
comparing a second purchase history of the first user to the first purchase history;
determining that the second purchase history satisfies a purchase history similarity threshold; and
updating the predictive user behavior model based at least in part on the determination that the second purchase history satisfies the purchase history similarity threshold.

6. The method of claim 5, further comprising:
generating a second customer score for the first user based at least in part on the browsing behavior in real-time;
determining that the second customer score does not meet the consumer segment modification threshold; and
disassociating the first user from the target consumer segment.

7. The method of claim 5, further comprising:
receiving an indication that an impression pixel has been presented;
determining that the first user has made a purchase; and
associating the browsing history of the first user with the selected user data.

8. The method of claim 5, wherein the target consumer segment comprises users that purchased a product instead of the target product brand, further comprising:
selecting a second set of users that purchased the product;
selecting a third set of users that did not purchase the product, wherein the selected user data comprises user data for the second set of users and the third set of users;
determining a first historical element associated with the second set of users, wherein the first historical element is a second number of browse node visits to a second browse node associated with the product;
determining a first average number of interactions between the second set of users and the second browse node;

determining a second historical element associated with the second set of users, wherein the second historical element is a number of product views at a second website associated with the product; and determining a second average number of interactions between the second set of users and the second website.

9. The method of claim 5, wherein the selected user data comprises user data for a second user, the method further comprising:

identifying first user attribute data associated with the first user;

identifying second user attribute data associated with the second user; and determining that a correlation between the first user attribute data and the second user attribute data meets a user similarity threshold.

10. A computer device comprising:

at least one memory that stores computer-executable instructions; and at least one processor configured to access the at least one memory and execute the computer-executable instructions to:

generate a predictive user behavior model for a target consumer segment based at least in part on selected user data, wherein the selected user data comprises a browsing history for one or more users, a purchase history for the one or more users, and user attribute data for the one or more users, wherein the target consumer segment comprises a target product brand;

generate a set of product identifiers associated with the target product brand;

determine a first set of users that made a first-time purchase of a product associated with the target product brand within a predetermined time interval to generate the selected user data;

determine that a first website is associated with purchases from the target product brand;

receive an indication that a user is browsing the first website;

generate a first customer score for the user using the predictive user behavior model in real-time;

receive an optimal delivery schedule, wherein the optimal delivery schedule comprises an optimal number of delivered impressions;

determine a consumer segment modification threshold based at least in part on a number of previously delivered impressions relative to the optimal delivery schedule;

determine, using the first customer score, that the first customer score meets the consumer segment modification threshold for the target consumer segment;

determine a first number of browse node visits to a first plurality of browse nodes associated with the target consumer segment during a predetermined time interval by the user included in the selected user data, wherein respective browse nodes comprise a set of webpages associated with at least one of a brand, a product or service, or a type of product or service;

determine a browsing behavior of the user;

compare the browsing behavior of the user to the first number of browse node visits;

determine that the browsing behavior satisfies a browsing similarity threshold;

associate the user with the target consumer segment;

determine an advertisement identifier for an advertisement associated with the target consumer segment;

cause presentation of an impression associated with the advertisement identifier at a user device associated with the user;

identify a first purchase history of the user included in the selected user data, wherein the first purchase history comprises a purchase after presentation of the impression;

compare a second purchase history of a second user of the one or more users to the first purchase history;

determine that the second purchase history satisfies a purchase history similarity threshold; and update the predictive user behavior model based at least in part on the determination that the second purchase history satisfies the purchase history similarity threshold.

11. The computer device of claim 10, wherein the at least one processor is further configured to execute the computer-executable instructions to:

generate a second customer score for the user based at least in part on the browsing behavior in real-time;

determine that the second customer score does not meet the consumer segment modification threshold; and disassociate the user from the target consumer segment.

12. The computer device of claim 10, wherein the at least one processor is further configured to execute the computer-executable instructions to:

receive an indication that an impression pixel has been presented;

determine that the user has made a purchase; and associate the browsing history of the user with the selected user data.

13. The computer device of claim 10, wherein the at least one processor is further configured to execute the computer-executable instructions to:

select a second set of users that purchased a product;

select a third set of users that did not purchase the product, wherein the selected user data comprises user data for the second set of users and the third set of users;

determine a first historical element associated with the first second set of users, wherein the first historical element is a second number of browse node visits to a second browse node associated with the product;

determine a first average number of interactions between the second set of users and the second browse node;

determine a second historical element associated with the second set of users, wherein the second historical element is a number of product views at a second website associated with the product; and determine a second average number of interactions between the second set of users and the second website.

* * * * *